US008688848B2

(12) United States Patent
Lu et al.

(10) Patent No.: US 8,688,848 B2
(45) Date of Patent: Apr. 1, 2014

(54) METHOD OF ESTABLISHING A MEDIA LINK FOR TRANSMITTING A LARGE MESSAGE MODE CPM MESSAGE TO A GROUP

(75) Inventors: Yan Lu, Shenzhen (CN); Ghazanfar Ali, Shenzhen (CN); Jun Chen, Shenzhen (CN); Lizhe Yao, Shenzhen (CN); Man Xie, Shenzhen (CN); Huan Guo, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 94 days.

(21) Appl. No.: 13/257,870

(22) PCT Filed: Dec. 30, 2009

(86) PCT No.: PCT/CN2009/076296
§ 371 (c)(1),
(2), (4) Date: Sep. 20, 2011

(87) PCT Pub. No.: WO2010/145183
PCT Pub. Date: Dec. 23, 2010

(65) Prior Publication Data
US 2012/0089741 A1    Apr. 12, 2012

(30) Foreign Application Priority Data

Jun. 16, 2009   (CN) .......................... 2009 1 0108302

(51) Int. Cl.
*G06F 15/16*    (2006.01)
(52) U.S. Cl.
USPC .......................................................... 709/228
(58) Field of Classification Search
USPC ................................................. 709/227–232
See application file for complete search history.

(56) References Cited

U.S. PATENT DOCUMENTS

2006/0223563 A1    10/2006    Sung et al.
2008/0009281 A1    1/2008    Sung et al.
(Continued)

FOREIGN PATENT DOCUMENTS

CN    101227418 A    7/2008
CN    1842179 A    6/2012
(Continued)

OTHER PUBLICATIONS

International Search Report in international application No. PCT/CN2009/076296, mailed on Apr. 15, 2010.
(Continued)

*Primary Examiner* — Benjamin R Bruckart
*Assistant Examiner* — Sibte Bukhari
(74) *Attorney, Agent, or Firm* — Oppedahl Patent Law Firm LLC

(57) ABSTRACT

The present invention provides a method of establishing a media transmission link for transmitting a large message mode Converged IP Messaging (CPM) message to a group. The method comprises the following steps: Session Description Protocol (SDP) media parameter negotiation is accomplished through session invite messages and success response messages among a transmitter CPM client, a source participation function entity, a controlling function entity, a destination participation function entity and a receiver CPM client; according to the negotiation result, media transmission links are respectively established between the transmitter CPM client and the source participation function entity, between the source participation function entity and the controlling function entity, between the controlling function entity and the destination participation function entity, and between the destination participation function entity and the receiver CPM client. The present invention solves the problem that there is a lack of the MSRP transmission link in the large message mode in the prior art.

14 Claims, 7 Drawing Sheets

(56) References Cited

U.S. PATENT DOCUMENTS

2008/0113679 A1* 5/2008 Sung et al. .................. 455/466
2008/0123686 A1 5/2008 Lee et al.
2009/0106455 A1* 4/2009 Xu et al. ...................... 709/248
2009/0279455 A1 11/2009 Wang et al.
2009/0286516 A1* 11/2009 Sedlacek et al. ........... 455/414.1

FOREIGN PATENT DOCUMENTS

WO 2008007869 A1 1/2008
WO 2008060085 A1 5/2008

OTHER PUBLICATIONS

English Translation of the Written Opinion of the International Search Authority in international application No. PCT/CN2009/076296, mailed on Apr. 15, 2010.
OMA Converged IP Messaging System Description Mar. 12, 2009.
The Message Session Relay Protocol (MSRP) Sep. 1, 2007.
SD-Large Messaging Mode Interworking Flow Apr. 10, 2009.
Converged IP Messaging Architecture Oct. 4, 2007.
Supplementary European Search Report in European application No. 09846097.5, mailed on Jul. 25, 2013.

* cited by examiner

METHOD OF ESTABLISHING A MEDIA LINK FOR TRANSMITTING A LARGE MESSAGE MODE CPM MESSAGE TO A GROUP

TECHNICAL FIELD

The present invention relates to the technical field of mobile communications, particularly to a method for transmitting Converged IP Messaging (CPM) and specifically to a method of establishing a media link for transmitting a large message mode CPM message.

BACKGROUND

CPM was proposed by Open Mobile Architecture (OMA) in 2005 to realize interworking of a plurality of message services and provide uniform message services and provide perfect, consistent and convenient message service experience. The CPM converges a plurality of existing message services, comprising Instant Message (IM), Push-To-Talk over Cellular (POC), Mobile E-Email (MEM), Short Messaging Service (SMS), Multimedia Messaging Service (MMS), etc.

The principal service forms of CPM comprise: CMP messages based on a pager-mode, large message mode CPM messages based on a session-mode and other CPM session services based on a session. Before the normal use of these services, users need to register with and log in a CPM system, i.e. usually called "online".

The large message mode CPM message refers to a CPM message of which the size exceeds the pre-defined limit in the CPM specification formulated by OMA, for example, exceeding the pre-defined limit of 1300 bytes. This large message mode CPM message cannot be directly borne with a Session Initiation Protocol (SIP) message.

The SIP message is used to transmit pager-mode messages between the transmitter's and receiver's CPM Clients and CPM Enablers. When the transmitter terminal needs to transmit a large message mode CPM message, if the size of the message exceeds the limit, then the message cannot be borne with an SIP message.

The CPM service supports CPM pre-defined groups and CPM ad-hoc groups. A CPM user may transmit a CPM pager message to an CPM ad-hoc group or a CPM pre-defined group, but if the size of the message exceeds the limit, then the message cannot be borne with an SIP message.

Paths for transmitting large message mode CPM messages comprise a signaling path and a media path, i.e., signaling is transmitted along a signaling path and media is transmitted along a media path. When a large message mode CPM message is transmitted to a group, a session invite message (INVITE) of the large message mode CPM message is used at first to establish a session between a transmitter CPM client and a controlling function entity, and between the controlling function entity and every receiver CPM client, accomplish media negotiation, and establish a transmission link between the transmitter CPM client and the controlling function entity, and between the controlling function entity and every receiver CPM client. Through the established transmission link, a Message Session Relay Protocol (MSRP) is used to transmit the media content of the large message mode CPM message, i.e. the content of CPM message to the foregoing receiver CPM client.

According to the CPM system framework, at the service level, the signaling path through which CPM transmits large messages needs to pass the transmitter CPM client, a source participation function entity to which the transmitter belongs, the controlling function entity, a destination participation function entity to which the receiver belongs and the receiver CPM client. There are two solutions for the CPM media path: in one solution, a media path is established between end and end without passing the participation function entity and the controlling function entity; and in the other solution, it is required to pass the participation function entity and/or the controlling function entity.

In the current formulation stage of the CPM specification, more manufacturers prefer the solution in which the media interface passes intermediate entities such as the participation function entity. Under this condition, media links i.e., MSRP Multiple Hops transmission needs to be established between the CPM transmitter client and the source participation function entity, between the source participation function entity and the controlling function entity, between the controlling function entity and the destination participation function entity, and between the destination participation function entity and the receiver client, respectively. The large message mode CPM message accomplishes the media negotiation by transmitting a large message session invite message from the transmitter to the receiver, so that every function entity gets the adjacent function entity with which it will establish a link, i.e. acquires the MSRP connection parameters of the entity with which it will establish a link, the MSRP connection parameters comprise IP address, port number and/or Universal Resource Identifier (URI). However, with respect to the transmission of large message mode CPM, currently no solution is available to solve the problem of sectionally establishing an MSRP multiple hops link among respective function entities, thereby establishing a complete MSRP transmission link.

SUMMARY

For this reason, the present invention provides a method of establishing a media transmission link for transmitting a large message mode CPM message to a group, to solve the problem that no method is available in the prior art to establish an MSRP multiple hops transmission link among respective function entities when a large message mode CPM message is transmitted to a group.

A method of establishing a media link for transmitting a large message mode CPM messages to a group, which is used to establish an MSRP multiple hops transmission media link through which a transmitter CPM client transmits a large message mode CPM message to a CPM pre-defined group or a CPM ad-hoc group, comprising: during establishment of an MSRP link between a transmitter CPM client and a receiver CPM client in a group, MSRP links are respectively established between the transmitter CPM client and a source participation function entity, between the source participation function entity and a controlling function entity, between the controlling function entity and a destination participation function entity, and between the destination participation function entity and the receiver CPM client, before establishing every MSRP link, an establisher of every MSRP link first acquires MSRP connection parameters of an adjacent function entity with which the establisher will establish a link through a media negotiation process, and establishes the MSRP link according to the MSRP connection parameters.

The media negotiation process comprises the following steps: the transmitter CPM client transmits a first session invite message which is routed to the source participation function entity via an SIP/IP core network; the source participation function entity generates and transmits a second session invite message which is routed to the controlling function entity via the SIP/IP core network, and, for each member of the group, the controlling function entity generates and transmits a third session invite message which is routed to the destination participation function entity via the SIP/IP core network; the destination participation function entity generates and transmits a fourth session invite message which is routed to the receiver CPM client via the SIP/IP core network; the receiver CPM client generates and transmits a fourth success response message which is routed to the destination participation function entity via the SIP/IP core network; and the destination participation function entity generates and transmits a third success response message which is routed to the controlling function entity via the SIP/IP core network;

after receiving the second session invite message or the third success response message, the controlling function entity generates and transmits a second success response message which is routed to the source participation function entity via the SIP/IP core network; and the source participation function entity generates and transmits a first success response message which is routed to the transmitter CPM client via the SIP/IP core network;

after receiving the first success response message, the transmitter CPM client generates and transmits a first response acknowledgement message which is routed to the source participation function entity via the SIP/IP core network;

the source participation function entity transmits a second response acknowledgement message which is routed to the controlling function entity via the SIP/IP core network;

the controlling function entity transmits a third response acknowledgement message which is routed to the destination participation function entity via the SIP/IP core network; and the destination participation function entity transmits a fourth response acknowledgement message which is routed to the receiver CPM client via the SIP/IP core network.

The connection parameters may be a URI parameter and/or IP address and a port number.

The foregoing solution may solve the problem that there is a lack of an MSRP transmission link in the large message mode in the prior art.

DETAILED DESCRIPTION

As a large message mode CPM message occupies larger space, it cannot be directly borne with an SIP message. Different from the transmission method of pager-mode CPM messages, the transmission paths of large message mode CPM messages comprise a signaling path and a media path, i.e. signaling is transmitted along the signaling path and media is transmitted along the media path. Therefore, in the embodiments of the present invention, when a large message mode CPM message is transmitted, a session invite message (SIP INVITE) of the large message mode CPM message is used at first to establish a session between a transmitter CPM client and a receiver CPM client, accomplish media negotiation and establish a transmission link between the transmitter CPM client and the receiver CPM client. Through the established transmission link, the MSRP is used to transmit the message body of the large message mode CPM message, i.e. the content of the CPM message, to the receiver CPM client. Under the technical background of this overall solution, the present invention provides detailed embodiments for completion of media link establishment.

In case of no conflict, the embodiments of the present invention and the characteristics thereof may be combined with each other.

The preferred embodiments of the present invention are described below in connection with the accompanying drawings. It should be understood that the preferred embodiments described here are intended to illustrate and explain, and not to limit the present invention.

The present invention provides a method of establishing a media transmission link for transmitting a large message mode CPM message to a group. By this method, MSRP media transmission links are established among respective function entities participating in the transmission process of large message mode CPM messages.

Figure 1:
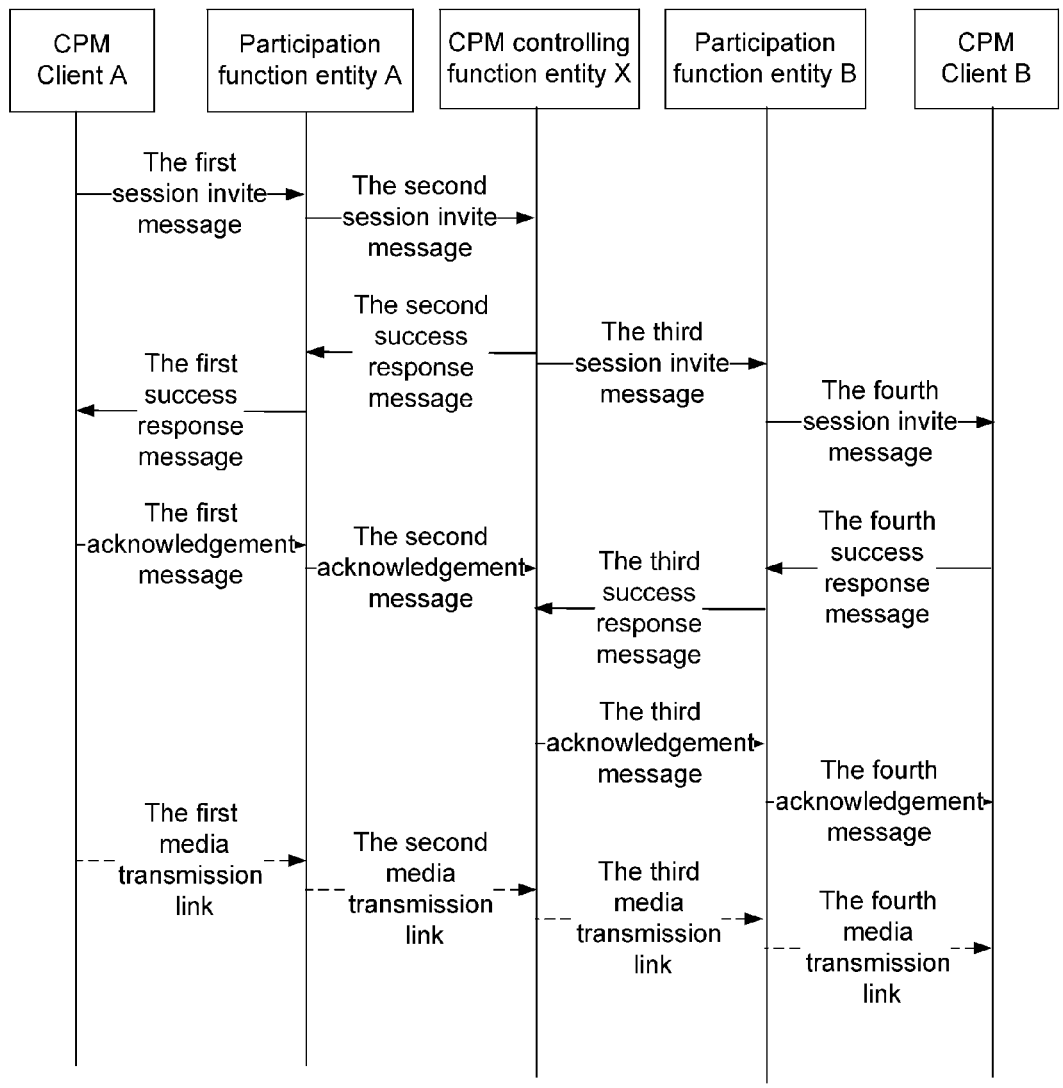
FIG. 1 is a flow chart of establishing an MSRP media link by taking the transmission of a large message mode CPM message from a CPM client to a group for example, wherein the initiator of a session invite message is the initiative party of the media link establishment, and the controlling function entity does not need to wait for a success response from the destination end before returning a success response message to the source end.
Figure 2:
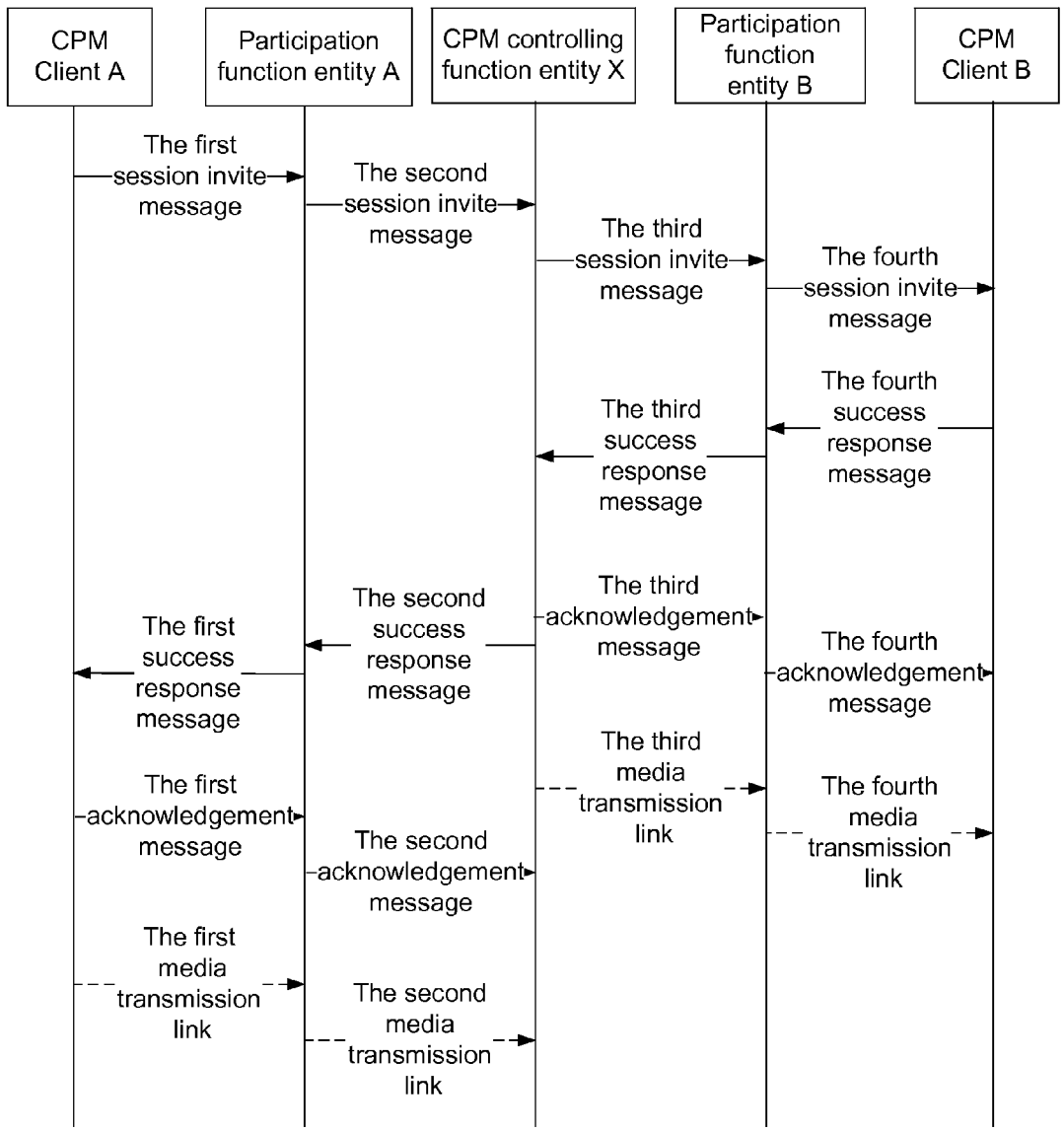
FIG. 2 is a flow chart of establishing an MSRP media link by taking the transmission of a large message mode CPM message from a CPM client to a group for example, wherein the initiator of a session invite message is the initiative party of the media link establishment, and the controlling function entity needs to wait for a success response from the destination end before returning a success response message to the source end.
Figure 3:
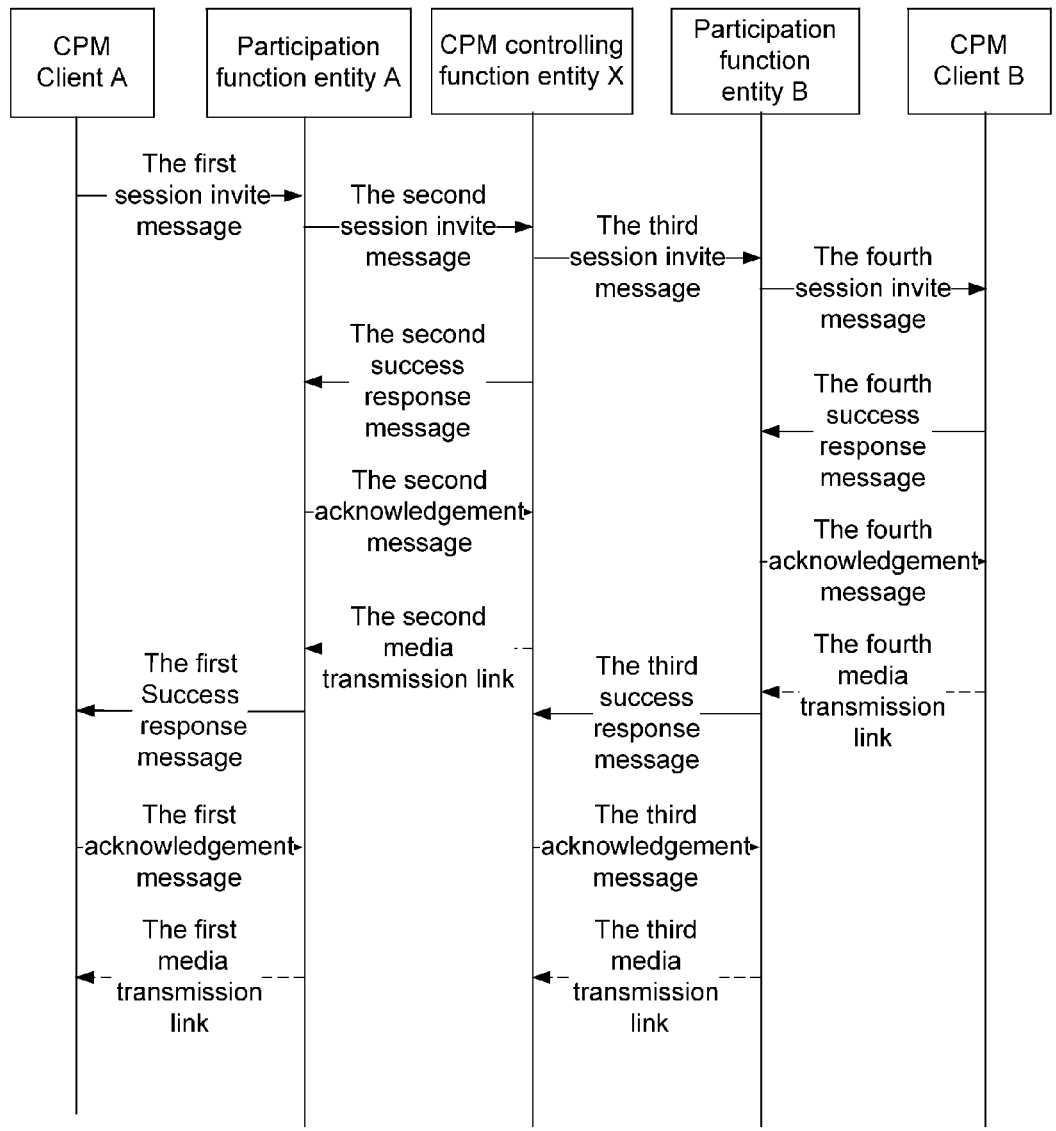
FIG. 3 is a flow chart of establishing an MSRP media link by taking the transmission of a large message mode CPM message from a CPM client to a group for example, wherein the receiver of a session invite message is the initiative party of the media link establishment, and the controlling function entity does not need to wait for a success response from the destination end before returning a success response message to the source end.
Figure 4:
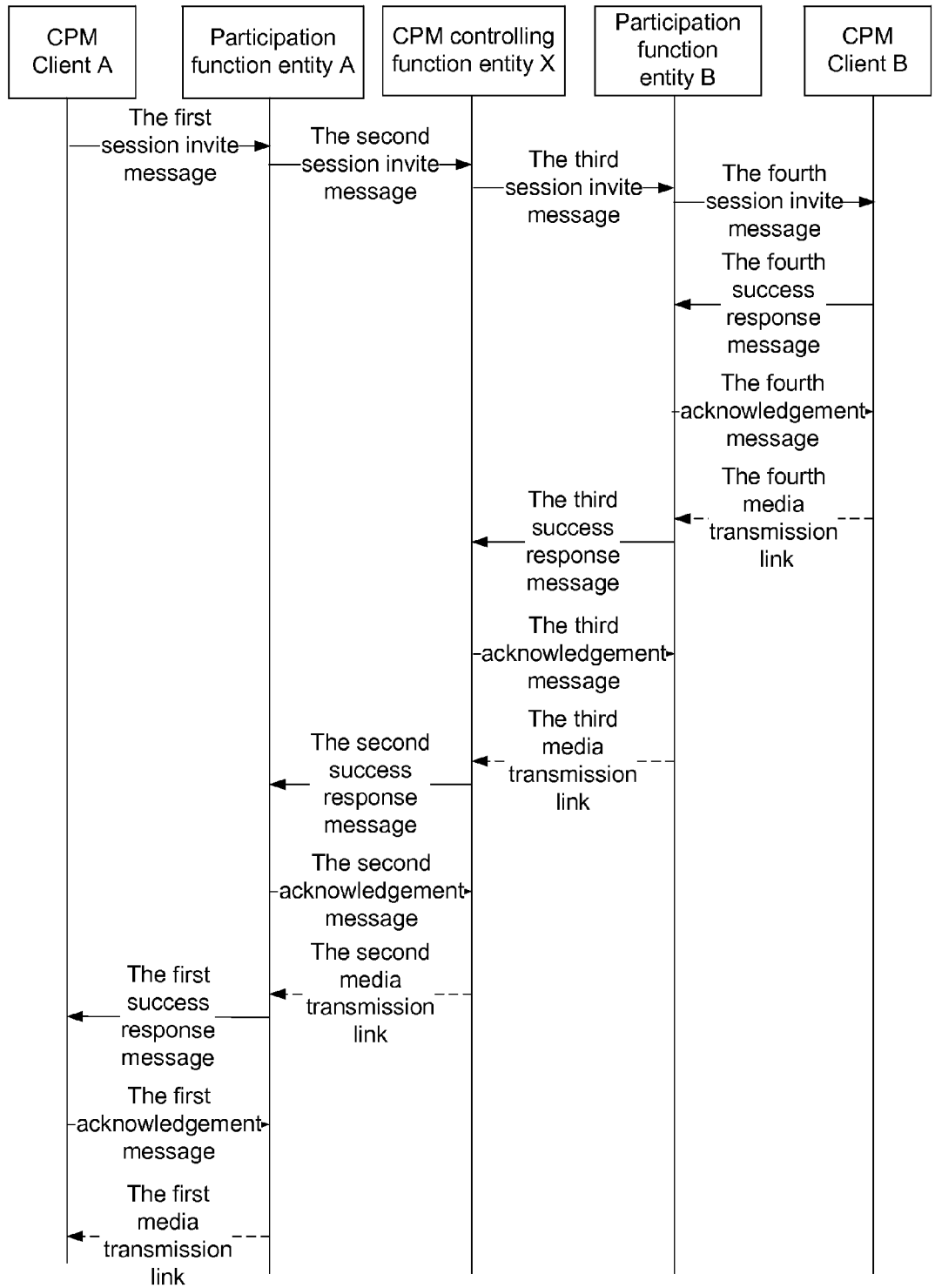
FIG. 4 is a flow chart of establishing an MSRP media link by taking the transmission of a large message mode CPM message from a CPM client to a group for example, wherein the receiver of a session invite message is the initiative party of the media link establishment, and the controlling function entity needs to wait for a success response from the destination end before returning a success response message to the source end.
Figure 5:
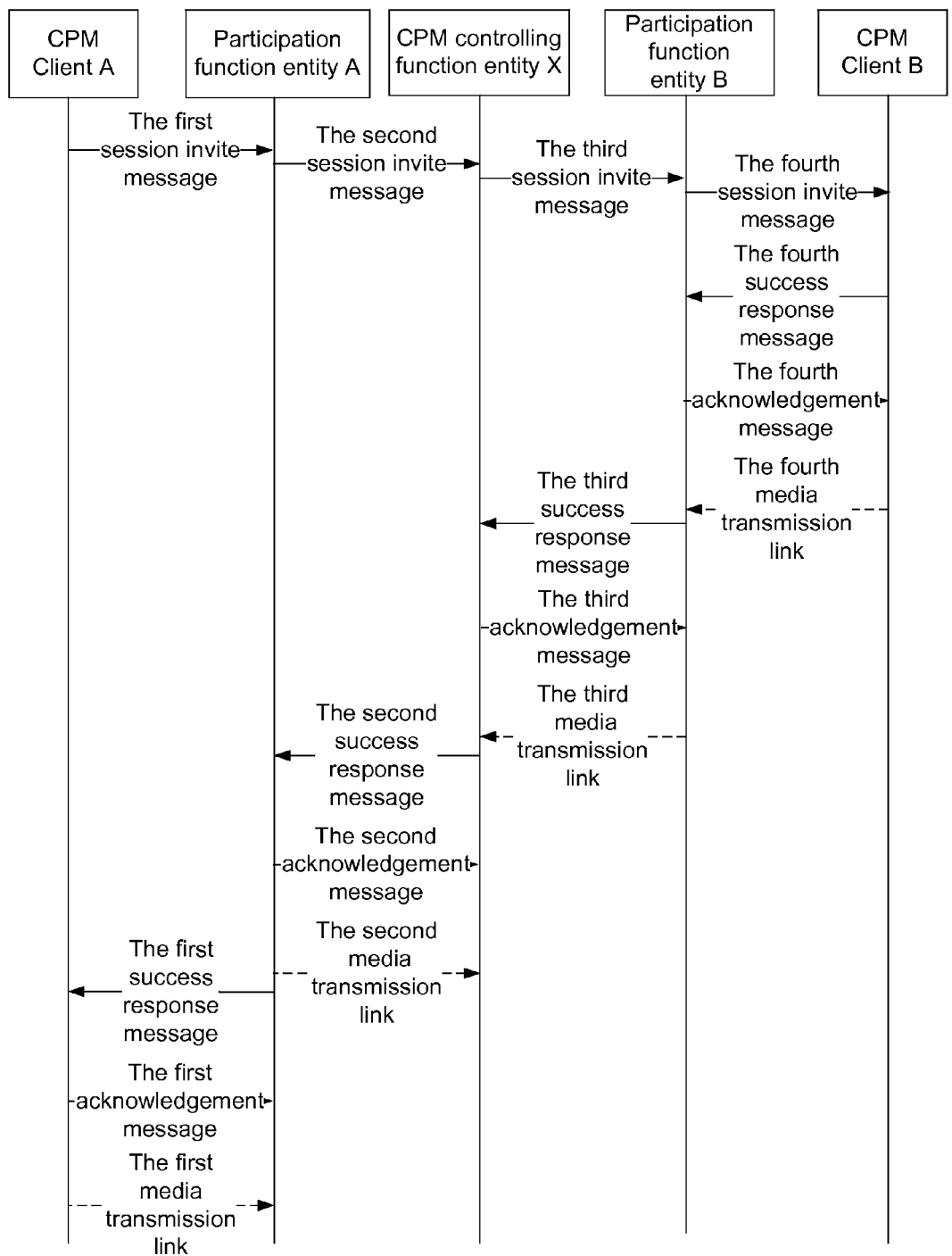
FIG. 5 is a flow chart of establishing an MSRP media link by taking the transmission of a large message mode CPM message from a CPM client to a group for example, wherein the CPM client is the initiative party of the media link establishment, and the controlling function entity needs to wait for a success response from the destination end before returning a success response message to the source end, and in this embodiment, after receiving the success response, the participation function entity will immediately return an acknowledgement message.
Figure 6:
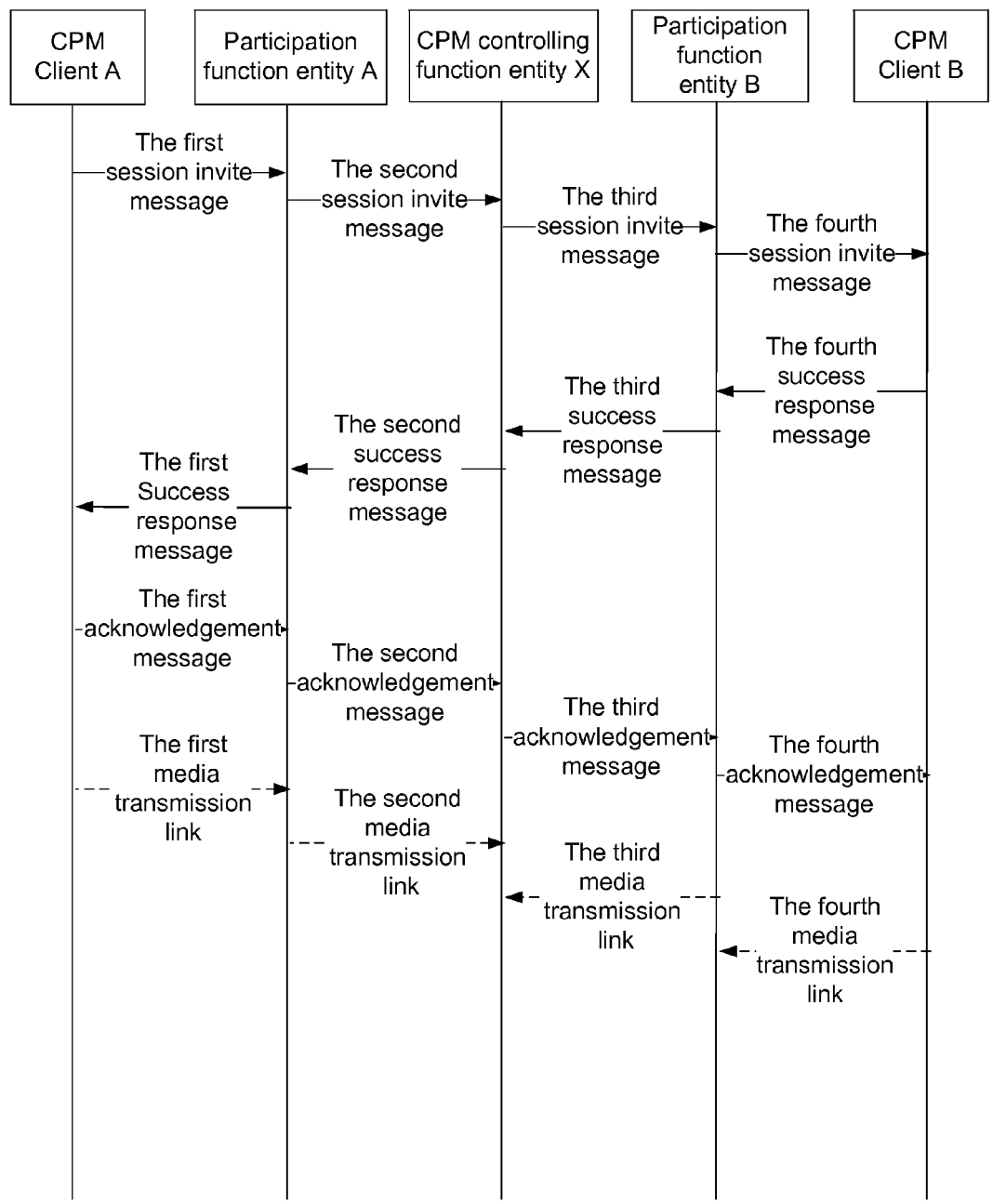
FIG. 6 is a flow chart of establishing an MSRP media link by taking the transmission of a large message mode CPM message from a CPM client to a group for example, wherein the CPM client is the initiative party of the media link establishment, and the controlling function entity needs to wait for a success response from the destination end before returning a success response message to the source end, and in this embodiment, after receiving the success response, the participation function entity needs to wait for an acknowledgement message from the source end before returning an acknowledgement message.
Figure 7:
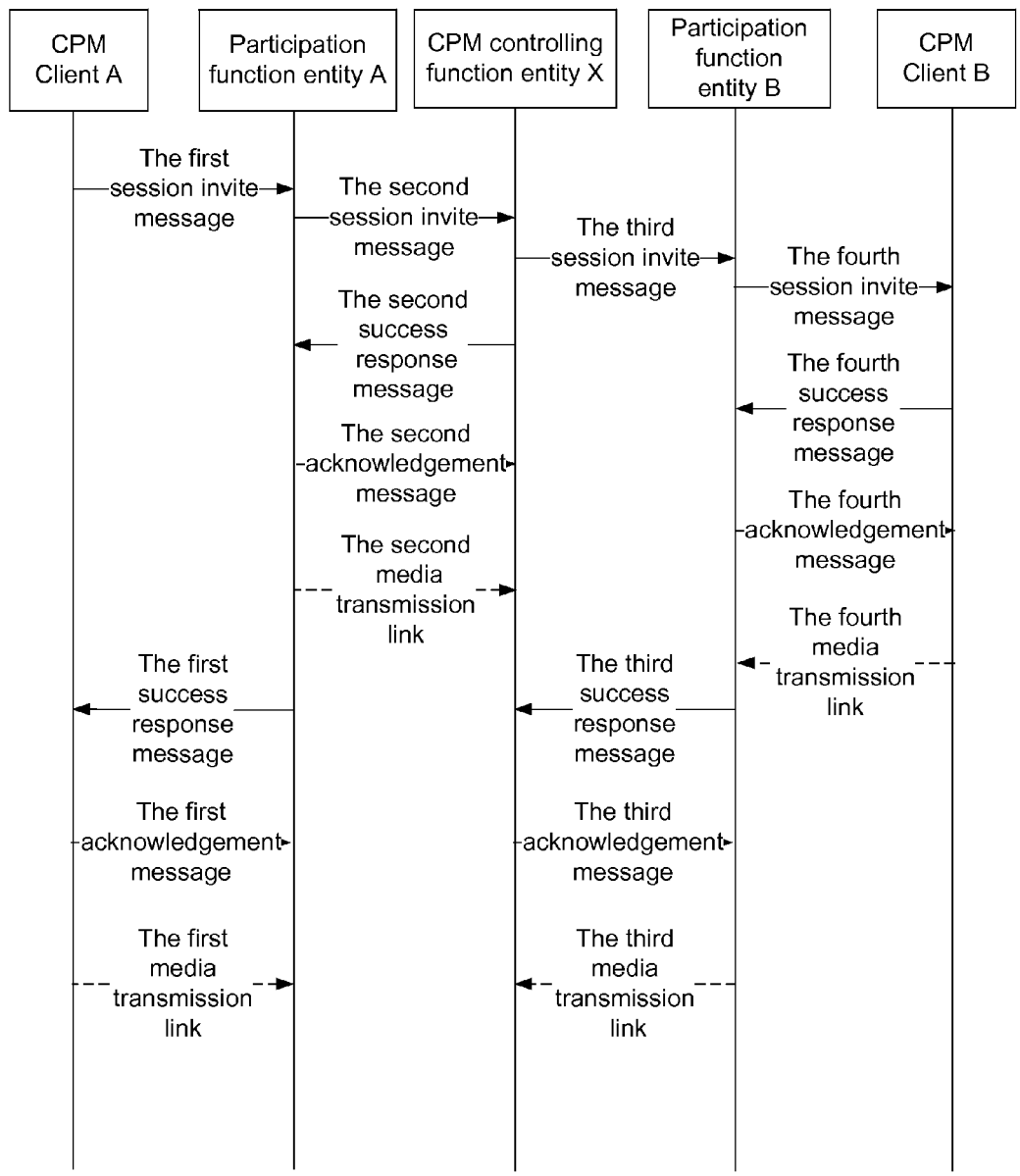
FIG. 7 is a flow chart of establishing an MSRP media link by taking the transmission of a large message mode CPM message from a CPM client to a group for example, wherein the CPM client is the initiative party of the media link establishment, and the controlling function entity does not need to wait for a success response from the destination end before returning a success response message to the source end.

The present invention provides three solutions for establishing an MSRP media link. The first is an embodiment in which the initiator of the invite message initiatively establishes an MSRP link, as shown in FIG. 1 and FIG. 2, the direction of the dashed-line arrows in the figures indicates the initiatively initiating direction of the link. The second is an embodiment in which the receiver of the invite message initiatively establishes an MSRP link, as shown in FIG. 3 and FIG. 4, the direction of the dashed-line arrows in the figures indicates the initiatively initiating direction of the link. The third is an embodiment in which the CPM client initiatively establishes an MSRP link, as shown in FIG. 5, FIG. 6 and FIG. 7, the direction of the dashed-line arrows in the figures indicates the initiatively initiating direction of the link. Further, the MSRP media transmission links in the present invention are based on Transmission Control Protocol (TCP), Stream Control Transmission Protocol (SCTP) and other link-oriented protocols.

FIG. 1, FIG. 2, FIG. 3, FIG. 4, FIG. 5, FIG. 6 and FIG. 7 show flow charts of establishing an MSRP media link for a large message mode CPM message by taking the transmission of a large message mode CPM message from a CPM client to a group for example.

FIG. 1, FIG. 2, FIG. 3, FIG. 4, FIG. 5, FIG. 6 and FIG. 7 all omit the function node of an SIP/IP core network. In fact, the signaling transmission between any two function entities is performed through the SIP/IP core network in the figures. The omission does not constitute a limitation to the present invention.

As shown in FIG. 1, the transmission of a large message mode CPM message from a CPM client to a group is taken for example, i.e, solution 1. The process in which the initiator of the invite message initiatively establishes an MSRP media link mainly comprises the following steps.

Step S101: a CPM Client A transmits a first session invite message (SIP INVITE) of a large message mode CPM message to a group, the invite message is routed to a participation function entity (Originating Participation Function) A, i.e. the participation function entity to which the transmitter belongs, or the source participation function entity, via the SIP/IP core network.

Step S102: the participation function entity A receives the session invite message from step S101, and processes, as Back to Back User Agent (B2BUA), the received message: generating a new session invite message (SIP INVITE), i.e. a second session invite message, and transmitting the second session invite message. The second session invite message is routed to a controlling function entity X via the SIP/IP core network.

Step S103: the controlling function entity X receives the session invite message from step S102, and processes, as a B2BUA, the received message: on the one hand, it generates and transmits a second success response message (SIP 200 OK), this response message is routed to the participation function entity A via the SIP/IP core network; on the other hand, for each receiver of the group (taking a member W of the group for example), the controlling function entity X generates and transmits a new session invite message (SIP INVITE), i.e. a third session invite message, this message contains a response Session Description Protocol (SDP) message. The controlling function entity X transmits this new session invite message (SIP INVITE) to each member of the group. The new session invite message is routed to the destination participation function entity (Terminating Participation Function) to which each receiver belongs, via the SIP/IP core network, in this embodiment, the destination participation function entity is the participation function entity B to which the member W belongs.

The second SIP 200 OK transmitted by the controlling function entity X contains a response SDP message. This message contains the MSRP connection parameter information of the controlling function entity X.

Step S104: the participation function entity A receives a second success response message from step S103, and processes, as a B2BUA, the received message: generating and transmitting a new response message (SIP 200 OK), i.e. a first success response message. This response message is routed to the CPM Client A via the SIP/IP core network. Through an SDP message, the first SIP 200 OK carries MSRP connection parameter information of the participation function entity A.

Step S105: after receiving the first success response message from step S104, the CPM Client A transmits a first acknowledgement message (SIP ACK). This ACK message is routed to the participation function entity A via the SIP/IP core network.

The transmitter CPM client initiates, as an initiative party, a link establishment request according to SIP 200 OK response negotiation result, and the MSRP connection parameters of the participation function entity A in the SDP response message, or chooses an existing link with matching host, port and URI as the MSRP link in this section. Therefore, the first media transmission link between the CPM Client A and the participation function entity A is established. After the first media transmission link is established, an MSRP SEND media transmission request is initiated.

Step S106: after receiving the first acknowledgement message from step S105, on the one hand, the participation function entity A establishes a new ACK, i.e. a second acknowledgement message and transmits the acknowledgement message, and the second acknowledgement message is routed to the controlling function entity X via the SIP/IP core network; on the other hand, the participation function entity A initiates, as an initiative party, a link establishment request according to the MSRP connection parameters of the controlling function entity X of response SDP in the SIP 200 OK response message, or chooses an existing link with matching host, port and URI as the MSRP link in this section. Therefore, the second media transmission link between the source participation function entity and the controlling function entity is established. After the second media transmission link is established, the MSRP SEND media transmission request is relayed and transmitted.

Step S107: the participation function entity B receives the third session invite message from step S103, and processes, as a B2BUA, the received message: generating a new session invite message (SIP INVITE), i.e. a fourth session invite message. This invite message is routed to the CPM Client B via the SIP/IP core network.

Step S108: the CPM Client B receives the fourth session invite message from step S107, and generates and transmits a fourth success response message (SIP 200 OK) of the invite message. This invite message is routed to the participation function entity B via the SIP/IP core network. The fourth SIP 200 OK contains an SDP message, the message contains MSRP connection parameter information of the CPM Client B.

Step S109: the participation function entity B receives the fourth success response message from step S108, and processes, as a B2BUA, the received message: generating and transmitting a new response message (SIP 200 OK), i.e. a third success response message. This invite message is routed to the controlling function entity X via the SIP/IP core network. The third SIP 200 OK contains an SDP message, the message contains MSRP connection parameter information of the participation function entity B.

Step S110: the Controlling function entity X receives the third success response message from step S109. Taking a destination receiver for example, the controlling function entity generates and transmits a third acknowledgement message, and the third acknowledgement message is routed to the destination participation function entity which is the participation function entity B in this embodiment, via the SIP/IP core network. On the other hand, the controlling function entity X initiates, as an initiative party, a link establishment request according to the MSRP connection parameter information of the participation function entity B of the SDP response in the SIP 200 OK response message, or chooses an existing link with matching host, port and URI as the MSRP link in this section; or the controlling function entity X initiates, as an initiative party, a link establishment request according to the path header information of the MSRP SEND request from step S106, or chooses an existing link with matching host, port and URI as the MSRP link in this section. Thereby, the third media transmission link between the controlling function entity X and the participation function entity B is established. After the third media transmission link is established, the MSRP SEND media transmission request is relayed and transmitted.

Step S111: after receiving the third acknowledgement message from step S110, on the one hand, the participation function entity B establishes a new ACK message, i.e. a fourth acknowledgement message and transmits this message, this ACK message is routed to the CPM Client B via the SIP/IP core network. On the other hand, the participation function entity B initiates, as an initiative party, a link establishment request according to the MSRP path information of the SDP response in the SIP 200 OK response message and MSRP connection parameter information of the CPM Client B of the SDP response in the response message, or chooses an existing link with matching host, port and URI as the MSRP link in this section. Thereby, the fourth media transmission link between the participation function entity B and the CPM Client B is established. After the fourth media transmission link is established, the MSRP SEND media transmission request is relayed and transmitted.

Step S112: after receiving the fourth acknowledgement message from step S111, the CPM Client B, as a passive party, accepts the transmission link establishment request from the initiative party, and receives media based on the established MSRP link.

In the foregoing solution 1, the MSRP connection parameter information contains IP address and port number, and/or URI parameter. The IP address may be carried by the SDP connection parameter c, the port number may be carried by the media parameter m, and the URI parameter may be carried by the path parameter a-path.

In the foregoing solution 1, the participation function entity A and the participation function entity B generate and transmit ACK messages after receiving ACK response messages. It should be additionally noted that after receiving a success response from the destination direction, the participation function entity A, the participation function entity B and the controlling function entity X may not need to wait for an ACK message from the source direction before generating and transmitting an ACK message for the received success response message. In solution 1, the SIP ACK messages transmitted by each network function entity may be newly established by each function entity or the directly forwarded ACK messages received, which is not limited by the present invention.

In the foregoing solution 1, the initiator of the invite message is the initiative party of the link establishment. The link establishment method shown in FIG. 2 is basically the same as that shown in FIG. 1 and is not described here again, while only the difference is explained. It should be particularly noted that after receiving the invite message from the source participation function entity A, the controlling function entity X may return an SIP 200 OK response to the source direction regardless of whether it receives an SIP 200 OK response from the destination direction or not, as shown in FIG. 1; or when the controlling function entity X receives a success response from the destination end, for example, when receives the first success response from the destination end, it returns an SIP 200 OK response to the source end, as shown in FIG. 2.

In the foregoing solution 1, the establishment process of the second media transmission link is triggered when the participation function entity A receives an ACK message. It should be additionally noted that the establishment process may be triggered when the participation function entity A receives the MSRP SEND request message from the CPM Client A; or the second media transmission link may be established after the participation function entity A receives a success response message from the controlling function entity X. This additional explanation is also applicable to the participation function entity B, which is not repeated herein, and also applicable to the establishments of the third and the fourth media transmission links. It should be additionally noted that the second and the fourth media transmission links have the same trigger timing, for example, they are both triggered after the ACK is received, or after the MSRP SEND request is received, or when the 200 OK response is received. The trigger timing of the third media transmission link initiatively established by the controlling function entity may adopt a triggering mode different from that of the participation function entity, i.e. the trigger may be performed when the ACK from the source direction is received, or when 200 OK is received or when an MSRP SEND request is received.

The embodiments shown in FIG. 3 and FIG. 4 illustrate the MSRP link establishment process when the receiver of the invite message is the initiative party of link establishment, i.e. solution 2. The link establishment method shown in FIG. 4 is basically the same as that shown in FIG. 3 and is not described here again, while only the difference is explained. It should be particularly noted that after receiving the invite message from the participation function entity A, the controlling function entity X may immediately return an SIP 200 OK response to the source direction, as shown in FIG. 3; or wait for a success response from the destination end, for example, the controlling function entity X returns an SIP 200 OK response to the source end when receiving the first success response from the destination end, as shown in FIG. 4. Taking the embodiment shown in FIG. 3 for example, after receiving an SIP 200 OK message, the destination participation function entity processes, as a B2BUA, this message, and on the one hand, generates a new SIP 200 OK message and transmits the message to the source end, and on the other hand, returns an acknowledgement message SIP ACK to the destination end.

FIG. 3 shows the MSRP link establishment process when the receiver of the invite message is the initiative party of link establishment, first, the transmission and receiving processes of the invite message and the success response message, i.e.

the media negotiation process are performed, which are similar to that in the foregoing solution 1 is and are not described here again, while only the necessary points are explained. In the media negotiation process of this embodiment, the CPM Client A transmits a first session invite message, the first session invite message contains MSRP connection parameters of the CPM Client A and is routed to the participation function entity A via the SIP/IP core network; the second session invite message transmitted by the participation function entity A contains MSRP connection parameters of the participation function entity A, and is routed to the controlling function entity X via the SIP/IP core network; the third session invite message transmitted by the controlling function entity X contains MSRP connection parameters of the controlling function entity X, and is routed to the participation function entity B via the SIP/IP core network; the fourth session invite message transmitted by the participation function entity B contains MSRP connection parameters of the participation function entity B, and is routed to the CPM Client B via the SIP/IP core network. The establishment process comprises the following steps.

Step S201: when receiving an SIP ACK message from the participation function entity B, the CPM Client B initiates, as an initiative party, a link establishment request according to the MSRP connection parameter information of the adjacent entity path, i.e. destination participation function entity B obtained in the media negotiation process, or chooses an existing link with matching host, port and URI as the MSRP link in this section. Therefore, the fourth media transmission link between the CPM Client B and the participation function entity B is established.

Step S202: after receiving an SIP ACK message from the controlling function entity X, the participation function entity B initiates, as an initiative party, a link establishment request according to the MSRP connection parameter information of the adjacent entity path, i.e. controlling function entity X obtained in the media negotiation process, or chooses an existing link with matching host, port and URI as the MSRP link in this section. Therefore, the third media transmission link between the participation function entity B and the controlling function entity X is established.

Step S203: after receiving an SIP ACK from the participation function entity A, the controlling function entity X initiates, as an initiative party, a link establishment request according to the MSRP connection parameter information of the adjacent entity path, i.e. source participation function entity obtained in the media negotiation process, or chooses an existing link with matching host, port and URI as the MSRP link in this section. Therefore, the second media transmission link between the controlling function entity X and the participation function entity A is established.

Step S204: after receiving an SIP ACK from the CPM Client A, the participation function entity A initiates, as an initiative party, a link establishment request according to the MSRP connection parameter information of the adjacent entity path, i.e. CPM Client A obtained in the media negotiation process, or chooses an existing link with matching host, port and URI as the MSRP link in this section. Therefore, the first media transmission link between the participation function entity A and the CPM Client A is established.

In the foregoing solution 2, the MSRP connection parameter information contains IP address and port number, and/or URI parameter. IP address may be carried by the SDP connection parameter c, the port number may be carried by the media parameter m, and the URI parameter may be carried by the path parameter a-path.

In the foregoing solution 2, the participation function entity A and the participation function entity B transmit an ACK message after receiving an ACK response message. It should be additionally noted that after receiving a success response from the destination direction, the participation function entity A and the participation function entity B and the controlling function entity X may not need to wait for an ACK message from the source direction before they generate and transmit an ACK message for the received success response message. In solution 2, the SIP ACK messages transmitted by each network function entity may be newly established by each function entity or the directly forwarded ACK messages received, which is not limited by the present invention.

The embodiments shown in FIG. 5, FIG. 6 and FIG. 7 describe the MSRP link establishment process when the CPM client is the initiative party of link establishment, i.e. solution 3.

The link establishment methods shown in FIG. 5, FIG. 6 and FIG. 7 are basically the same and are not described here again, while only the difference is explained. It should be particularly noted that after receiving the invite message from the participation function entity A, the controlling function entity X may immediately return an SIP 200 OK response to the source direction, as shown in FIG. 7; or the controlling function entity X may wait for a success response from the destination end, for example, return an SIP 200 OK response to the source end when receiving the first success response from the destination end, as shown in FIG. 5 and FIG. 6.

FIG. 6 illustrates the MSRP link establishment process when the CPM client is the initiative party of the link establishment, first, the transmission and receiving processes of the invite message and the success response message, i.e. the media negotiation process are performed, which are similar to that in the foregoing solution and are not described here again, while only the necessary points are explained. In the media negotiation process of this embodiment, the participation function entity A transmits a first success response message, the messages contains the MSRP connection parameters of the participation function entity A and is routed to the CPM Client A via the SIP/IP core network; the fourth session invite message transmitted by the participation function entity B contains the MSRP connection parameters of the participation function entity B and is routed to the CPM Client B via the SIP/IP core network; the second success response message transmitted by the controlling function entity X contains the MSRP connection parameters of the controlling function entity X and is routed to the participation function entity A via the SIP/IP core network, or the second session invite message transmitted by the participation function entity A contains the MSRP connection parameters of the participation function entity A and is routed to the controlling function entity X via the SIP/IP core network; the third session invite message transmitted by the controlling function entity X contains the MSRP connection parameters of the controlling function entity X and is routed to the participation function entity B via the SIP/IP core network, or the third success response message transmitted by the participation function entity B contains the MSRP connection parameters of the participation function entity B and is routed to the controlling function entity X via the SIP/IP core network. The establishment process comprises the following steps.

Step S301: the CPM Client A receives a success response message SIP 200 OK. The CPM Client A transmits an acknowledgement message SIP ACK, the ACK message is routed to the participation function entity A via the SIP/IP core network. The CPM Client A initiates, as an initiative party, a link establishment request according to the MSRP connection parameter resulting from SIP 200 OK negotiation, i.e. MSRP connection parameter information of the participation function entity A, or chooses an existing link with matching host, port and URI as the MSRP link in this section. Therefore, the first media transmission link between the CPM Client A and the participation function entity A is established. Later an MSRP SEND media transmission request is initiated.

Step S302: after receiving an SIP ACK from the CPM Client A, the participation function entity A initiates, as an initiative party, a link establishment request according to the MSRP connection parameter information of the adjacent entity path, i.e. MSRP connection parameter information of the controlling function entity obtained in the media negotiation process, or chooses an existing link with matching host, port and URI as the MSRP link in this section. Therefore, the second media transmission link between the participation function entity A and the controlling function entity X is established.

Step S303: after receiving an SIP ACK message from the controlling function entity X, the participation function entity B initiates, as an initiative party, a link establishment request according to the MSRP connection parameter information of the adjacent entity path, i.e. the MSRP connection parameter information of the controlling function entity obtained in the media negotiation process, or chooses an existing link with matching host, port and URI as the MSRP link in this section. Therefore, the third media transmission link between the participation function entity B and the controlling function entity X is established.

Step S304: after receiving an SIP ACK message from the participation function entity B, the CPM Client B initiates, as an initiative party, a link establishment request according to the MSRP connection parameter information of the adjacent entity path, i.e. the MSRP connection parameter information of participation function entity B obtained in the media negotiation process, or chooses an existing link with matching host, port and URI as the MSRP link in this section. Therefore, the fourth media transmission link between the CPM Client B and the participation function entity B is established.

The basic link establishment process of the embodiment shown in FIG. 5 is similar to that of the embodiment shown in FIG. 6, so it is not described here again. The difference between the two embodiments is that in the embodiment shown in FIG. 5, the participation function entity A, the participation function entity B and the controlling function entity all may immediately return an acknowledgement message SIP ACK after receiving a success response.

The difference of the embodiment shown in FIG. 7 from the embodiments shown in FIG. 5 and FIG. 6 is that after receiving a session invite message, the controlling function entity may return a success response to the source end without needing to wait for a success response from the destination end. The link establishment process of the embodiment shown in FIG. 7 is similar to the basic process shown in FIG. 6 and is not described here again.

In the embodiments shown in FIG. 5, FIG. 6 and FIG. 7, the second media transmission link is initiatively established by the participation function entity A, and the third media transmission link is initiatively established by the participation function entity B. Alternatively, the controlling function entity may initiatively establish the second media transmission link or the controlling function entity initiatively establishes the third media transmission link.

In the foregoing solution 3, MSRP connection parameter information contains IP address and port number, and/or URI parameter. The IP address may be carried by the SDP connection parameter c, the port number may be carried by the media parameter m, and the URI parameter may be carried by the path parameter a-path.

In the foregoing solution 3, if the second media transmission link is established by the participation function entity A, the second media transmission link may be established after the participation function entity A receives an ACK message, or after the participation function entity A receives an MSRP SEND request message from the CPM Client A; alternatively, the participation function entity A may also establish the second media transmission link after receiving a success response message from the controlling function entity X.

Likewise, if the third media transmission link is established by the controlling function entity X, the third media transmission link may be established after the controlling function entity X receives an ACK message, or after the controlling function entity X receives an MSRP SEND request message from the participation function entity A; alternatively, the controlling function entity X may also establish the second media transmission link after receiving a success response message from the participation function entity B.

In the embodiments shown in FIG. 5, FIG. 6 and FIG. 7, after receiving an invite message from the participation function entity A, the controlling function entity X may immediately return an SIP 200 OK response to the source direction, or wait for a success response from the destination end, for example, the controlling function entity X returns an SIP 200 OK response to the source end when receiving the first success response from the destination end.

In the foregoing solution 3, the participation function entity A and the participation function entity B transmit an ACK message after receiving an ACK response message. It should be additionally noted that after receiving a success response from the destination direction, the participation function entity A and the participation function entity B and the controlling function entity X may generate and transmit an ACK message for the received success response message without needing to wait for an ACK message from the source direction. In the solution 3, the SIP ACK messages transmitted by respective network function entities may be newly established by the respective function entities or the directly forwarded ACK messages received, which is not limited by the present invention.

In each of the foregoing solutions, if certain MSRP link is established by the initiator of a session invite message, the establishment may be triggered after the establisher receives an SIP 200 OK response from the destination direction or after the establisher receives an SIP ACK from the source direction, or when the establisher receives an MSRP SEND request from the source direction.

The method of establishing a media link for transmitting large message mode CPM messages provided by the present invention is also applicable to the transmission of CPM messages of less than 1300 bytes.

As described above, it should be additionally noted that whether the initiator of the session invite message is the initiative party of link establishment, or the receiver of the session invite message is the initiative party of link establishment, the initiative party or passive party of the MSRP link may be pre-defined, i.e. adopting the preset mode, or may be determined through an SDP negotiation process. If it is determined based on SDP negotiation result, then in the specific implementation, specific function entities may be pre-defined as the initiative parties of the link according to the SDP default value. The preconditions of the foregoing solutions of the present invention (i.e. the entities as initiative parties are all fixed) all may be considered as the default pre-defined conditions under this circumstance. Of course, in specific implementation, for each function entity, the two roles of the initiative party and passive party for link establishment may be designed. During system operation, the initiative party or passive party is determined based on SDP negotiation result. With the technical solutions according to the embodiments of the present invention, the information exchange conducted through the SDP carried by the session invite message of a large message mode CPM message and the success response message, provides a solution for negotiation of the connection parameters required for establishing an MSRP media transmission link for transmitting a large message mode CPM message to a group among a plurality of network function entities. According to the negotiation result, the initiator or receiver of the session invite message is the initiative party for the establishment of each section of MSRP link, so that a complete MSRP media transmission link is established from the transmitter CPM client to every receiver CPM client in the group.

The foregoing descriptions are preferred embodiments of the present invention and are not intended to limit the present invention. For those skilled in the art, the present invention may have various changes and modifications. Any modifications, equivalent replacements and improvements and the like made without departing from the spirit and principle of the present invention shall be within the protection scope of the present invention.

What is claimed is:

1. A method of establishing a media link for transmitting a CPM message to a group, comprising:
   the transmitter CPM client transmitting a first session invite message which is routed to a source participation function entity via the SIP/IP core network; the source participation function entity generating and transmitting a second session invite message which is routed to a controlling function entity via the SIP/IP core network, and for each member of the group, the controlling function entity generating and transmitting a third session invite message which is routed to a destination participation function entity via the SIP/IP core network; the destination participation function entity generating and transmitting a fourth session invite message which is routed to a receiver CPM client via the SIP/IP core network; the receiver CPM client generating and transmitting a fourth success response message which is routed to the destination participation function entity via the SIP/IP core network, and the destination participation function entity generating and transmitting a third success response message which is routed to the controlling function entity via the SIP/IP core network;
   after receiving the second session invite message, or the third success response message, the controlling function entity generating and transmitting a second success response message which is routed to the source participation function entity via the SIP/IP core network; and the source participation function entity generating and transmitting a first success response message which is routed to the transmitter CPM client via the SIP/IP core network;
   the transmitter CPM client receiving the first success response message, and generating and transmitting a first response acknowledgement message which is routed to the source participation function entity via the SIP/IP core network; and the transmitter CPM client establishing a first media transmission link between the transmitter CPM client and the source participation function entity;
   the source participation function entity generating and transmitting a second response acknowledgement message which is routed to the controlling function entity via the SIP/IP core network; and the source participation function entity establishing a second media transmission link between the source participation function entity and the controlling function entity;
   the controlling function entity generating and transmitting a third response acknowledgement message which is routed to the destination participation function entity via the SIP/IP core network; and the destination participation function entity establishing a third media transmission link between the destination participation function entity and the controlling function entity; and
   the destination participation function entity generating and transmitting a fourth response acknowledgement message which is routed to the receiver CPM client via the SIP/IP core network; and the receiver CPM client establishing a fourth media transmission link between the receiver CPM client and the destination participation function entity,
   wherein the CPM message is a large message mode CPM message which cannot be borne with a Session Initiation Protocol (SIP) message,
   wherein the method is used to establish an MSRP multiple hops transmission media link through which a transmitter CPM client transmits a large message mode CPM message to a CPM pre-defined group or a CPM ad-hoc group, and
   wherein a CPM client is an initiative party for establishment of each section of media link;
   wherein, the establishment processes of the first, second, third and fourth media transmission links comprise:
      the transmitter CPM client chooses an existing link with matching host, port and/or URI as the first media transmission link; or the transmitter CPM client, as an initiative party, establishes the first media transmission link;
      the source participation function entity chooses an existing link with matching host, port and/or URI as the second media transmission link; or the source participation function entity, as an initiative party, establishes the second media transmission link;
      the receiver CPM client chooses an existing link with matching host, port and/or URI as the fourth media transmission link; or the receiver CPM client, as an initiative party, establishes the fourth media transmission link; and
      the destination participation function entity chooses an existing link with matching host, port and/or URI as the third media transmission link; or the destination participation function entity, as an initiative party, establishes the third media transmission link.

2. The method according to claim 1, further comprising:
   after receiving the first response acknowledgement message, the source participation function entity generating and transmitting the second response acknowledgement message; and after receiving the third response acknowledgement message, the destination participation function entity generating and transmitting the fourth response acknowledgement message; or
   after receiving the second success response message, the source participation function entity generating and transmitting the second response acknowledgement message; and after receiving the fourth success response message, the destination participation function entity generating and transmitting the fourth response acknowledgement message.

3. The method according to claim 1, further comprising:
after receiving the third success response message, or the second response acknowledgement message, the controlling function entity generating and transmitting the third response acknowledgement message.

4. A method of establishing a media link for transmitting a CPM message to a group, comprising:
the transmitter CPM client transmitting a first session invite message which is routed to a source participation function entity via an SIP/IP core network; the source participation function entity generating and transmitting a second session invite message which is routed to a controlling function entity via the SIP/IP core network, and for each member of the group, the controlling function entity generating and transmitting a third session invite message which is routed to a destination participation function entity via the SIP/IP core network; the destination participation function entity generating and transmitting a fourth session invite message which is routed to a receiver CPM client via the SIP/IP core network; the receiver CPM client generating and transmitting a fourth success response message which is routed to the destination participation function entity via the SIP/IP core network, and the destination participation function entity generating and transmitting a third success response message which is routed to the controlling function entity via the SIP/IP core network;
after receiving the second session invite message, or the third success response message, the controlling function entity generating and transmitting a second success response message which is routed to the source participation function entity via the SIP/IP core network; and the source participation function entity generating and transmitting a first success response message which is routed to the transmitter CPM client via the SIP/IP core network;
after receiving the fourth success response message, the destination participation function entity generating and transmitting a fourth response acknowledgement message which is routed to the receiver CPM client via the SIP/IP core network; and the receiver CPM client establishing a fourth media transmission link between the receiver CPM client and the destination participation function entity;
after receiving the third success response message, the controlling function entity generating and transmitting a third response acknowledgement message which is routed to the destination participation function entity via the SIP/IP core network; and the destination participation function entity establishing a third media transmission link between the destination participation function entity and the controlling function entity;
after receiving the second success response message, the source participation function entity generating and transmitting a second response acknowledgement message which is routed to the controlling function entity via the SIP/IP core network; and the controlling function entity establishing a second media transmission link between the controlling function entity and the source participation function entity; and
after receiving the first success response message, the transmitter CPM client generating and transmitting a first response acknowledgement message which is routed to the source participation function entity via the SIP/IP core network; and the source participation function entity establishing a first media transmission link between the source participation function entity and the transmitter CPM client,
wherein the CPM message is a large message mode CPM message which cannot be borne with a Session Initiation Protocol (SIP) message,
wherein the method is used to establish an MSRP multiple hops transmission media link through which a transmitter CPM client transmits a large message mode CPM message to a CPM pre-defined group or a CPM ad-hoc group, and
wherein a receiver of a session invite message is an initiative party for establishment of each section of media link;
wherein the establishment processes of the first, second, third and fourth media transmission links comprise:
the receiver CPM client chooses an existing link with matching host, port and/or URI as the fourth media transmission link; or the receiver CPM client as, an initiative party, establishes the fourth media transmission link;
the destination participation function entity chooses an existing link with matching host, port and/or URI as the third media transmission link; or the destination participation function entity, as an initiative party, establishes the third media transmission link;
the controlling function entity chooses an existing link with matching host, port and/or URI as the second media transmission link; or the controlling function entity, as an initiative party, establishes the second media transmission link; and
the source participation function entity chooses an existing link with matching host, port and/or URI as the first media transmission link; or the source participation function entity, as an initiative party, establishes the first media transmission link.

5. A method of establishing a media link for transmitting a CPM message to a group, comprising: during establishment of an MSRP link between the transmitter CPM client and a receiver CPM client of the group, MSRP links being respectively established between the transmitter CPM client and a source participation function entity, between the source participation function entity and a controlling function entity, between the controlling function entity and a destination participation function entity, and between the destination participation function entity and the receiver CPM client, and an establisher of each section of MSRP link acquiring MSRP connection parameter of an adjacent function entity with which the establisher will establish a link through the media negotiation process before it establishes the MSRP link, and establishing the MSRP link according to the MSRP connection parameter,
wherein the CPM message is a large message mode CPM message which cannot be borne with a Session Initiation Protocol (SIP) message, and
wherein the method is used to establish an MSRP multiple hops transmission media link through which a transmitter CPM client transmits a large message mode CPM message to a CPM pre-defined group or a CPM ad-hoc group;
wherein the media negotiation process comprises: a transmitter CPM client transmits a first session invite message which is routed to a source participation function entity via an SIP/IP core network; the source participation function entity generates and transmits a second session invite message which is routed to a controlling function entity via the SIP/IP core network, and for each member of the group, the controlling function entity generates and transmits a third session invite message which is routed to the destination participation function entity via the SIP/IP core network; the destination participation function entity generates and transmits a fourth session invite message which is routed to the receiver CPM client via the SIP/IP core network; the receiver CPM client generates and transmits a fourth success response message which is routed to the destination participation function entity via the SIP/IP core network, and the destination participation function entity generates and transmits a third success response message which is routed to the controlling function entity via the SIP/IP core network;

after receiving the second session invite message, or the third success response message, the controlling function entity generates and transmits a second success response message which is routed to the source participation function entity via the SIP/IP core network; and the source participation function entity generates and transmits a first success response message which is routed to the transmitter CPM client via the SIP/IP core network;

after receiving the first success response message, the transmitter CPM client generates and transmits a first response acknowledgement message which is routed to the source participation function entity via the SIP/IP core network;

the source participation function entity transmits a second response acknowledgement message which is routed to the controlling function entity via the SIP/IP core network;

the controlling function entity transmits a third response acknowledgement message which is routed to the destination participation function entity via the SIP/IP core network; and the destination participation function entity transmits a fourth response acknowledgement message which is routed to the receiver CPM client via the SIP/IP core network;

the method further comprises:

the fourth success response message transmitted by the receiver CPM client containing the MSRP connection parameter of the receiver CPM client; the third success response message transmitted by the destination participation function entity containing the MSRP connection parameter of the destination participation function entity; the second success response message transmitted by the controlling function entity containing the MSRP connection parameter of the controlling function entity; and the first success response message transmitted by the source participation function entity containing the MSRP connection parameter of the source participation function entity;

the transmitter CPM client establishing a first MSRP link between the transmitter CPM client and the source participation function entity according to the MSRP connection parameter of the source participation function entity; the source participation function entity establishing a second MSRP link between the source participation function entity and the controlling function entity according to the MSRP connection parameter of the controlling function entity; the controlling function entity establishing a third MSRP link between the controlling function entity and the destination participation function entity according to the MSRP connection parameter of the destination participation function entity; and the destination participation function entity establishing a fourth MSRP link between the destination participation function entity and the receiver CPM client according to the MSRP connection parameter of the receiver CPM client.

6. A method of establishing a media link for transmitting a CPM message to a group, comprising: during establishment of an MSRP link between the transmitter CPM client and a receiver CPM client of the group, MSRP links being respectively established between the transmitter CPM client and a source participation function entity, between the source participation function entity and a controlling function entity, between the controlling function entity and a destination participation function entity, and between the destination participation function entity and the receiver CPM client, and an establisher of each section of MSRP link acquiring MSRP connection parameter of an adjacent function entity with which the establisher will establish a link through the media negotiation process before it establishes the MSRP link, and establishing the MSRP link according to the MSRP connection parameter, wherein the CPM message is a large message mode CPM message which cannot be borne with a Session Initiation Protocol (SIP) message, and wherein the method is used to establish an MSRP multiple hops transmission media link through which a transmitter CPM client transmits a large message mode CPM message to a CPM pre-defined group or a CPM ad-hoc group;

wherein the media negotiation process comprises: a transmitter CPM client transmits a first session invite message which is routed to a source participation function entity via an SIP/IP core network; the source participation function entity generates and transmits a second session invite message which is routed to a controlling function entity via the SIP/IP core network, and for each member of the group, the controlling function entity generates and transmits a third session invite message which is routed to the destination participation function entity via the SIP/IP core network; the destination participation function entity generates and transmits a fourth session invite message which is routed to the receiver CPM client via the SIP/IP core network; the receiver CPM client generates and transmits a fourth success response message which is routed to the destination participation function entity via the SIP/IP core network, and the destination participation function entity generates and transmits a third success response message which is routed to the controlling function entity via the SIP/IP core network;

after receiving the second session invite message, or the third success response message, the controlling function entity generates and transmits a second success response message which is routed to the source participation function entity via the SIP/IP core network; and the source participation function entity generates and transmits a first success response message which is routed to the transmitter CPM client via the SIP/IP core network;

after receiving the first success response message, the transmitter CPM client generates and transmits a first response acknowledgement message which is routed to the source participation function entity via the SIP/IP core network;

the source participation function entity transmits a second response acknowledgement message which is routed to the controlling function entity via the SIP/IP core network;

the controlling function entity transmits a third response acknowledgement message which is routed to the destination participation function entity via the SIP/IP core network; and the destination participation function entity transmits a fourth response acknowledgement message which is routed to the receiver CPM client via the SIP/IP core network;

the method further comprises:

the first session invite message transmitted by the transmitter CPM client containing the MSRP connection parameter of the transmitter CPM client; the second session invite message transmitted by the source participation function entity containing the MSRP connection parameter of the source participation function entity; the third session invite message transmitted by the controlling function entity containing the MSRP connection parameter of the controlling function entity; and the fourth session invite message transmitted by the destination participation function entity containing the MSRP connection parameter of the destination participation function entity; and the source participation function entity establishing the first MSRP link between the source participation function entity and the transmitter CPM client according to the MSRP connection parameter of the transmitter CPM client; the controlling function entity establishing the second MSRP link between the controlling function entity and the source participation function entity according to the MSRP connection parameter of the source participation function entity; the destination participation function entity establishing the third MSRP link between the destination participation function entity and the controlling function entity according to the MSRP connection parameter of the controlling function entity; and the receiver CPM client establishing the fourth MSRP link between the receiver CPM client and the destination participation function entity according to the MSRP connection parameter of the destination participation function entity.

7. A method of establishing a media link for transmitting a CPM message to a group, comprising: during establishment of an MSRP link between the transmitter CPM client and a receiver CPM client of the group, MSRP links being respectively established between the transmitter CPM client and a source participation function entity, between the source participation function entity and a controlling function entity, between the controlling function entity and a destination participation function entity, and between the destination participation function entity and the receiver CPM client, and an establisher of each section of MSRP link acquiring MSRP connection parameter of an adjacent function entity with which the establisher will establish a link through the media negotiation process before it establishes the MSRP link, and establishing the MSRP link according to the MSRP connection parameter, wherein the CPM message is a large message mode CPM message which cannot be borne with a Session Initiation Protocol (SIP) message, and wherein the method is used to establish an MSRP multiple hops transmission media link through which a transmitter CPM client transmits a large message mode CPM message to a CPM pre-defined group or a CPM ad-hoc group;

wherein the media negotiation process comprises: a transmitter CPM client transmits a first session invite message which is routed to a source participation function entity via an SIP/IP core network; the source participation function entity generates and transmits a second session invite message which is routed to a controlling function entity via the SIP/IP core network, and for each member of the group, the controlling function entity generates and transmits a third session invite message which is routed to the destination participation function entity via the SIP/IP core network; the destination participation function entity generates and transmits a fourth session invite message which is routed to the receiver CPM client via the SIP/IP core network; the receiver CPM client generates and transmits a fourth success response message which is routed to the destination participation function entity via the SIP/IP core network, and the destination participation function entity generates and transmits a third success response message which is routed to the controlling function entity via the SIP/IP core network;

after receiving the second session invite message, or the third success response message, the controlling function entity generates and transmits a second success response message which is routed to the source participation function entity via the SIP/IP core network; and the source participation function entity generates and transmits a first success response message which is routed to the transmitter CPM client via the SIP/IP core network;

after receiving the first success response message, the transmitter CPM client generates and transmits a first response acknowledgement message which is routed to the source participation function entity via the SIP/IP core network;

the source participation function entity transmits a second response acknowledgement message which is routed to the controlling function entity via the SIP/IP core network;

the controlling function entity transmits a third response acknowledgement message which is routed to the destination participation function entity via the SIP/IP core network; and the destination participation function entity transmits a fourth response acknowledgement message which is routed to the receiver CPM client via the SIP/IP core network;

the method further comprises:

the fourth session invite message transmitted by the destination participation function entity containing the MSRP connection parameter of the destination participation function entity; the first success response message transmitted by the source participation function entity containing the MSRP connection parameter of the source participation function entity; the second session invite message transmitted by the source participation function entity containing the MSRP connection parameter of the source participation function entity, or the second success response message transmitted by the controlling function entity containing the MSRP connection parameter of the controlling function entity; and the third session invite message transmitted by the controlling function entity containing the MSRP connection parameter of the controlling function entity, or the third success response message transmitted by the destination participation function entity containing the MSRP connection parameter of the destination participation function entity;

the first MSRP link between the transmitter CPM client and the source participation function entity being established by the transmitter CPM client according to the MSRP connection parameter of the source participation function entity; and the fourth MSRP link between the receiver CPM client and the destination participation function entity being established by the receiver CPM client according to the MSRP connection parameter of the destination participation function entity;

the second MSRP link between the source participation function entity and the controlling function entity being established by the source participation function entity according to the MSRP connection parameter of the controlling function entity, or established by the controlling function entity according to the MSRP connection parameter of the source participation function entity; and the third MSRP link between the controlling function entity and the destination participation function entity being established by the destination participation function entity according to the MSRP connection parameter of the controlling function entity, or established by the controlling function entity according to the MSRP connection parameter of the destination participation function entity.

8. The method according to claim 5, further comprising:
after establishing the first MSRP link, the transmitter CPM client transmitting a first media transmission request; after receiving the first media transmission request, the source participation function entity establishing the second MSRP link according to the MSRP connection parameter of the controlling function entity; and the MSRP connection parameter of the controlling function entity being obtained from the second success response message or from path header information of the first media transmission request;

the source participation function entity relaying and transmitting media data in the received first media transmission request through the second media transmission link; after receiving a second media transmission request, the controlling function entity establishing the third media transmission link according to the MSRP connection parameter of the destination participation function entity; and the MSRP connection parameter of the destination participation function entity being obtained from the third success response message or from path head information of the second media transmission request; and the controlling function entity relaying and transmitting media data in the received second media transmission request through the third media transmission link; after receiving a third media transmission request, the destination participation function entity establishing the fourth MSRP link according to the MSRP connection parameter of the receiver CPM client; and the MSRP connection parameter of the receiver CPM client being obtained from the fourth success response message or from path header information of the third media transmission request.

9. The method according to claim 5, further comprising:
the MSRP link establishment method being that the establisher initiates a link establishment request according to the MSRP connection parameter of the adjacent entity, or chooses an existing MSRP link with matching host, port and/or MSRP URI as the MSRP link to be established.

10. The method according to claim 5, further comprising:
the first MSRP link being established by the link establisher after the link establisher receives the first success response message;

the second MSRP link being established by the link establisher after the link establisher receives the second success response message or the first acknowledgement message;

the third MSRP link being established by the link establisher after the link establisher receives the third success response message or the second acknowledgement message; and the fourth MSRP link being established by the link establisher after the link establisher receives the fourth success response message or the third acknowledgement message.

11. The method according to claim 6, further comprising:
the first MSRP link being established by the link establisher after the link establisher receives the first acknowledgement message;

the second MSRP link being established by the link establisher after the link establisher receives the second acknowledgement message;

the third MSRP link being established by the link establisher after the link establisher receives the third acknowledgement message; and the fourth MSRP link being established by the link establisher after the link establisher receives the fourth acknowledgement message.

12. The method according to claim 7, further comprising:
the first MSRP link being established by the link establisher after the link establisher receives the first success response message;

the fourth MSRP link being established by the link establisher after the link establisher receives the fourth acknowledgement message;

when the second MSRP link is established by the controlling function entity, the second MSRP link being established by the link establisher after the link establisher receives the second acknowledgement message;

when the second MSRP link is established by the source participation function entity, the second MSRP link being established by the link establisher after the link establisher receives the second success response message, the first acknowledgement message, or an MSRP SEND request from the first MSRP link;

when the third MSRP link is established by the destination participation function entity, the third MSRP link being established by the link establisher after the link establisher receives the third acknowledgement message; and when the third MSRP link is established by the controlling function entity, the third MSRP link being established by the link establisher after the link establisher receives the third success response message, the second acknowledgement message, or an MSRP SEND request from the second MSRP link.

13. The method according to claim 6, further comprising:
the MSRP link establishment method being that the establisher initiates a link establishment request according to the MSRP connection parameter of the adjacent entity, or chooses an existing MSRP link with matching host, port and/or MSRP URI as the MSRP link to be established.

14. The method according to claim 7, further comprising:
the MSRP link establishment method being that the establisher initiates a link establishment request according to the MSRP connection parameter of the adjacent entity, or chooses an existing MSRP link with matching host, port and/or MSRP URI as the MSRP link to be established.

* * * * *

UNITED STATES PATENT AND TRADEMARK OFFICE
CERTIFICATE OF CORRECTION

PATENT NO. : 8,688,848 B2  Page 1 of 1
APPLICATION NO. : 13/257870
DATED : April 1, 2014
INVENTOR(S) : Lu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 57 days.

Signed and Sealed this

Twenty-ninth Day of September, 2015

Michelle K. Lee
*Director of the United States Patent and Trademark Office*